United States Patent
Minor et al.

(10) Patent No.: US 6,511,129 B1
(45) Date of Patent: Jan. 28, 2003

(54) FOLDING SEAT HINGE ASSEMBLY WITH LIFT AND PUSH HANDLE ACTIVATION

(75) Inventors: Eric B. Minor, Macomb Township, MI (US); Craig Carlson, Harper Woods, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 49 days.

(21) Appl. No.: 09/874,752

(22) Filed: Jun. 5, 2001

(51) Int. Cl.[7] .................................................. B60N 2/02
(52) U.S. Cl. .................. 297/367; 297/378.12; 297/326; 297/329; 297/331; 297/335
(58) Field of Search .............................. 297/326, 327, 297/329, 331, 335, 367, 378.12

(56) References Cited

U.S. PATENT DOCUMENTS

| | | | |
|---|---|---|---|
| 4,219,234 A | | 8/1980 | Bell |
| 4,243,264 A | | 1/1981 | Bell |
| 4,279,442 A | | 7/1981 | Bell |
| 4,372,610 A | | 2/1983 | Fisher et al. |
| 4,484,779 A | * | 11/1984 | Suzuki ........................ 297/326 |
| 4,579,387 A | | 4/1986 | Bell |
| 4,747,641 A | | 5/1988 | Bell |
| 4,795,213 A | | 1/1989 | Bell |
| 4,822,100 A | | 4/1989 | Bell |
| 5,044,647 A | * | 9/1991 | Patterson .................. 280/250.1 |
| 5,435,624 A | * | 7/1995 | Bray et al. ............. 297/362.11 |
| 5,460,429 A | | 10/1995 | Whalen |
| 6,139,104 A | * | 10/2000 | Brewer ........................ 297/353 |
| 6,161,899 A | | 12/2000 | Shihong Yu |
| 6,328,381 B1 | * | 12/2001 | Smuk .......................... 297/365 |
| 6,447,066 B1 | * | 9/2002 | Chabanne et al. .......... 297/367 |

* cited by examiner

*Primary Examiner*—Peter M. Cuomo
*Assistant Examiner*—Joseph Edell
(74) *Attorney, Agent, or Firm*—Harness, Dickey & Pierce, P.L.C.

(57) ABSTRACT

A seat hinge assembly includes a lower support pivotally supporting an intermediate support and an upper support pivotally supported by the intermediate support. The intermediate support is selectively locked in one of two positions via a lower cam and lock pin. A pawl is pivotally supported by the intermediate support and includes a tooth portion for selective engagement with a tooth portion of the upper support. A spindle is rotatably supported by the intermediate support and is in operative communication with an upper cam. Rotation of the spindle in a first direction disengages the upper cam from the pawl, thus disengaging the teeth portions for enabling forward rotation of the upper support relative to the lower support. Subsequently, the spindle is rotatable in a second direction for disengaging the lower cam and lock pin arrangement for enabling rotation of the intermediate support relative to the lower support.

33 Claims, 9 Drawing Sheets

FOLDING SEAT HINGE ASSEMBLY WITH LIFT AND PUSH HANDLE ACTIVATION

FIELD OF THE INVENTION

The present invention relates to seat hinge assemblies and more particularly to a seat hinge assembly having a lift-and-push handle activation.

SUMMARY OF THE INVENTION

The present invention provides a seat hinge assembly comprising a lower support member having a shoulder defining a first stop face, a first cam surface and a second stop face, an intermediate support member pivotally supported at a lower portion by the lower support member and selectively locked in one of two rotational positions relative to the lower support member via a lower cam and lock pin arrangement engaging one of either the first or second stop faces. Also provided is a pawl pivotally supported by the intermediate support, the pawl having a pawl tooth portion, an upper support member pivotally supported by an upper portion of the intermediate support member, the upper support member having a tooth portion for selective engagement with the pawl tooth portion of the pawl. A spindle is rotatably supported by the intermediate support member and is in operative communication with an upper cam. The upper cam slidably engages the pawl, whereby rotation of the spindle in a first direction disengages the upper cam from the pawl, thus disengaging the pawl tooth portion from the tooth portion for enabling forward rotation of the upper support member relative to the lower support member. Upon sufficient forward rotation of the upper support member relative to the intermediate support, the spindle is rotatable in a second direction for disengaging the lower cam and lock pin arrangement from either of the first or second stop faces, thus enabling rotation of the intermediate support member relative to the lower support member.

DETAILED DESCRIPTION OF THE PREFERRED EMBODIMENT

Figure 1:
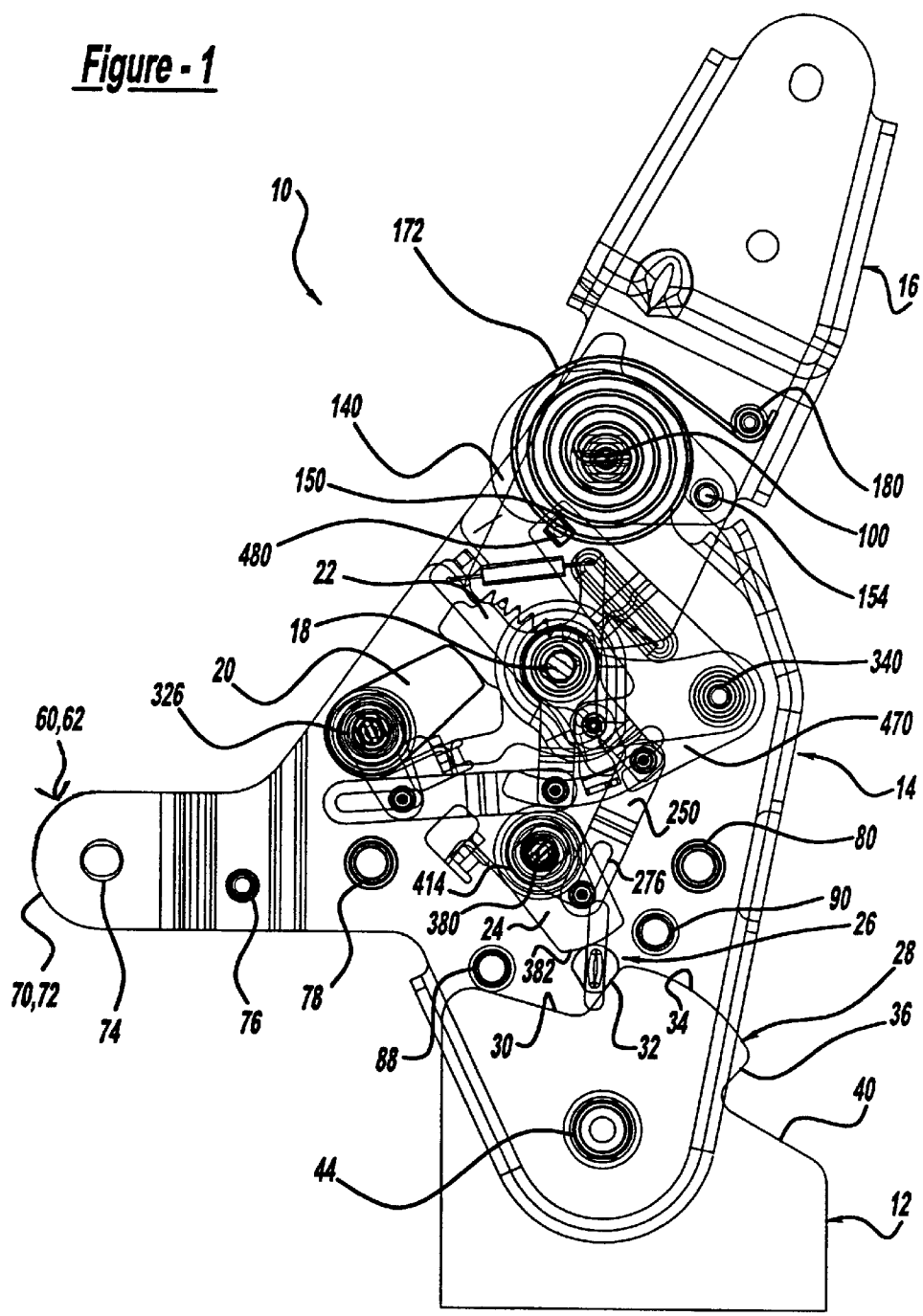
FIG. 1 is a side view detailing components of a seat hinge assembly according to the present invention.
Figure 2:
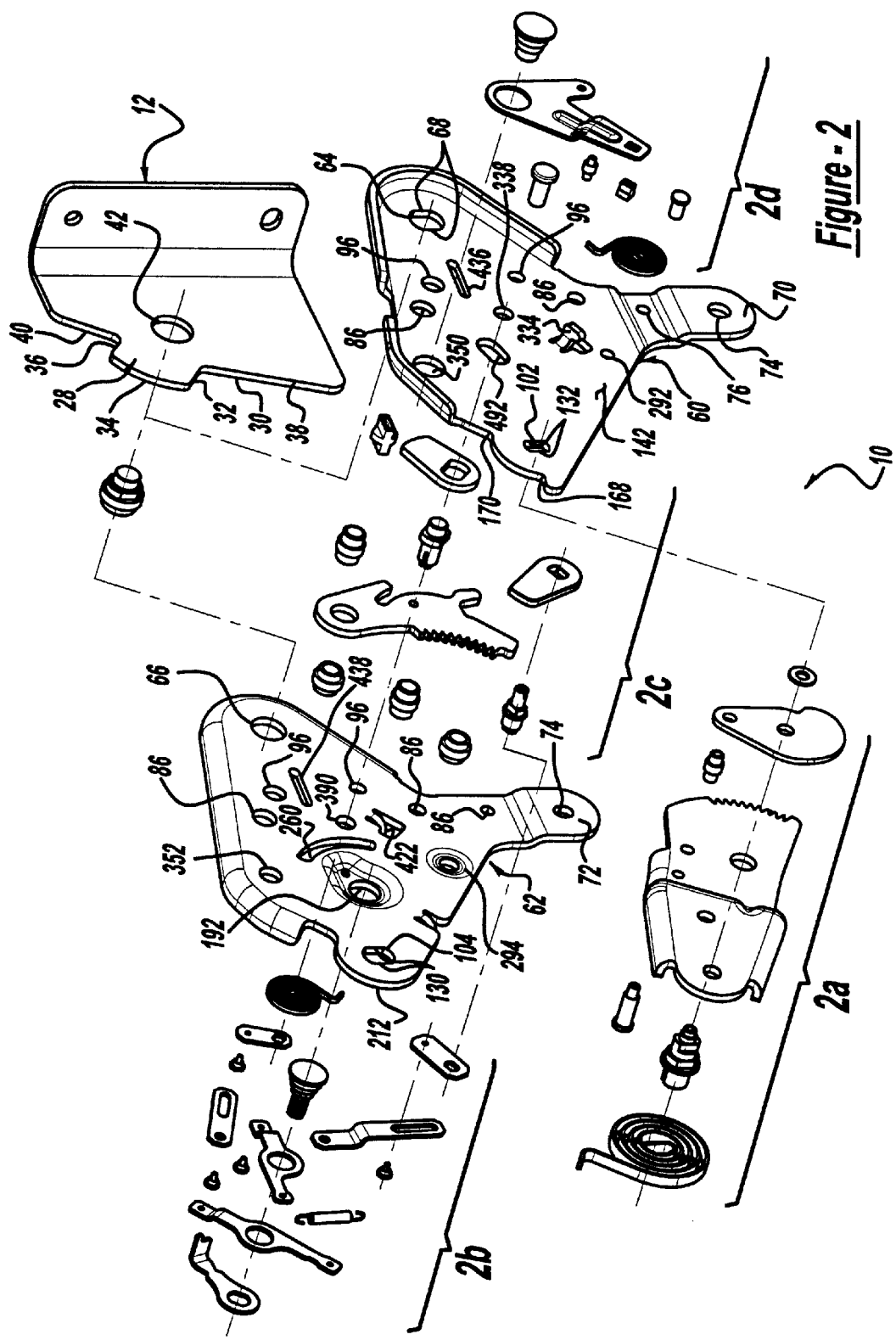
FIG. 2 is an exploded perspective view of the seat hinge assembly of FIG. 1.
Figure 2A:
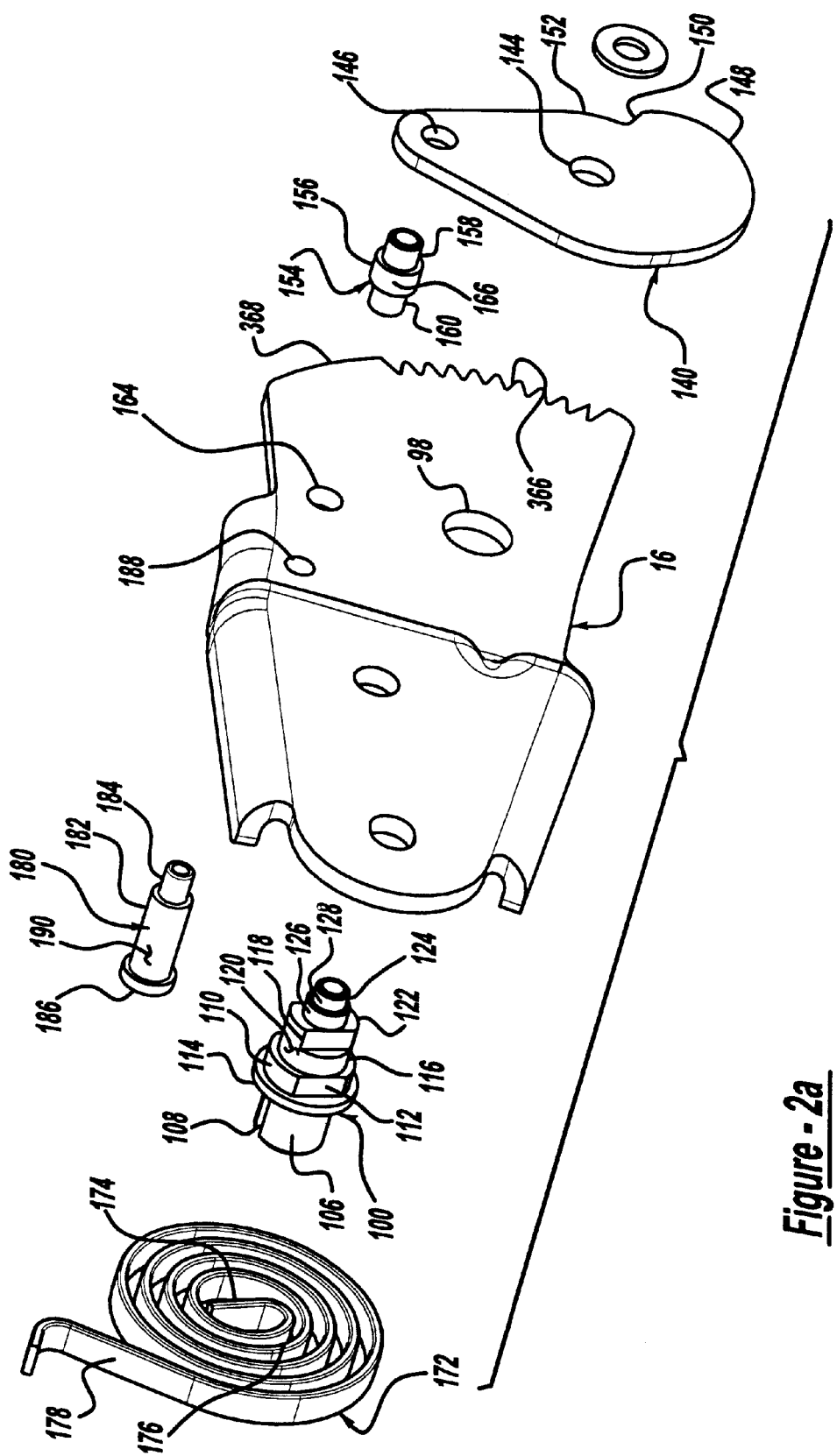
FIG. 2A is an exploded perspective view of an upper support member assembly of FIG. 2.
Figure 2B:
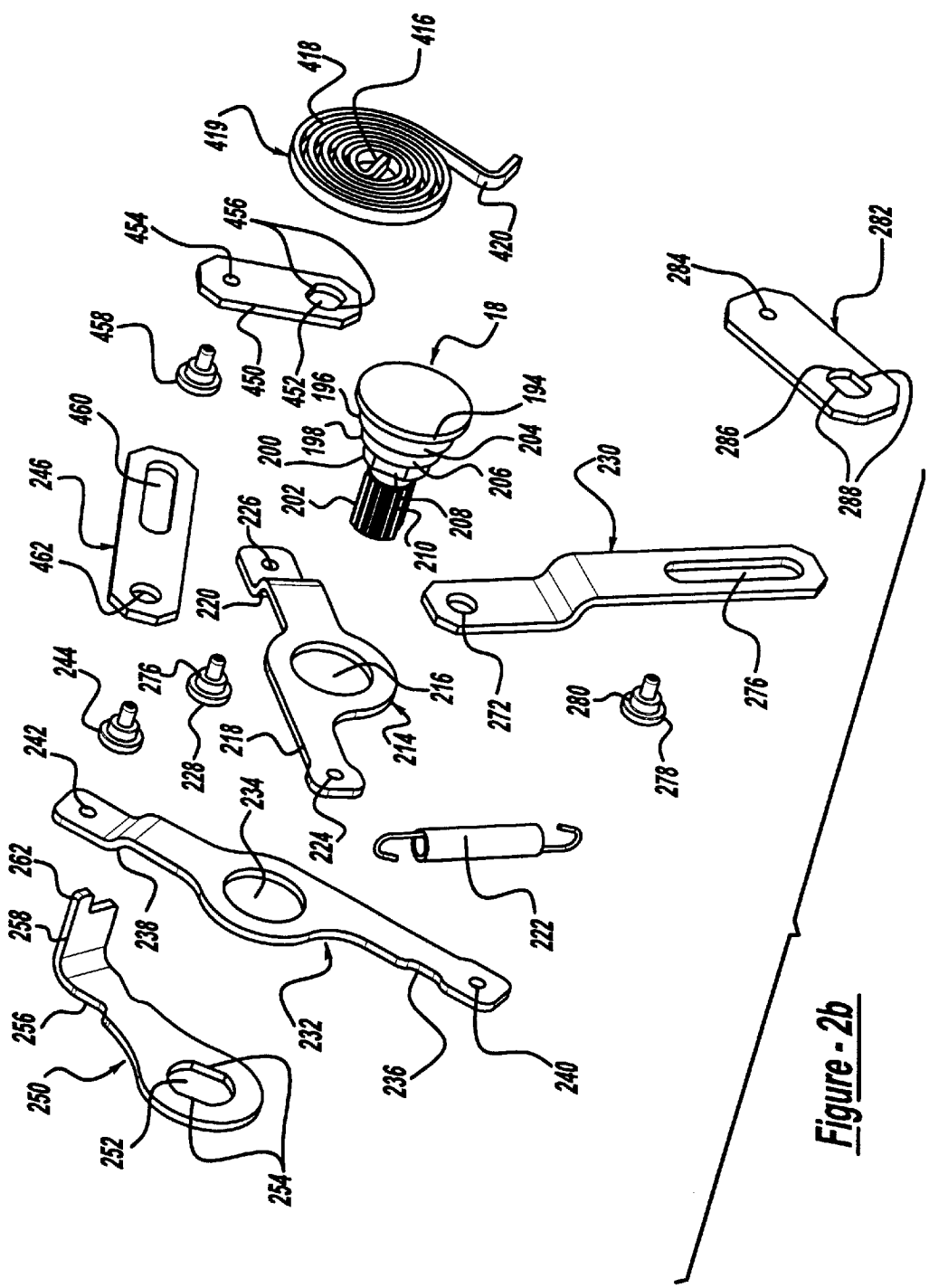
FIG. 2B is an exploded perspective view of a spindle assembly of FIG. 2.
Figure 2C:
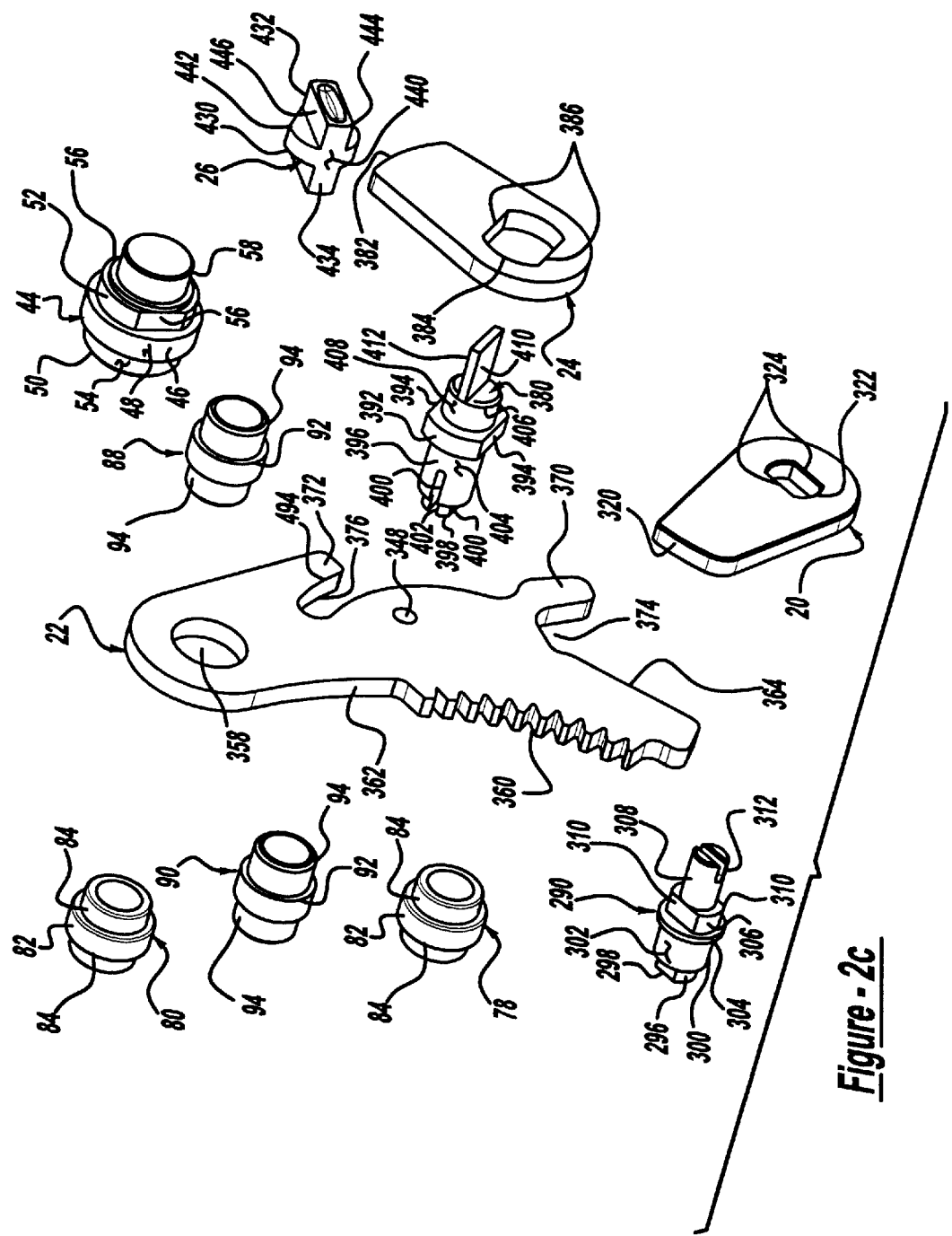
FIG. 2C is an exploded perspective view of pawl and cam components of FIG. 2.
Figure 2D:
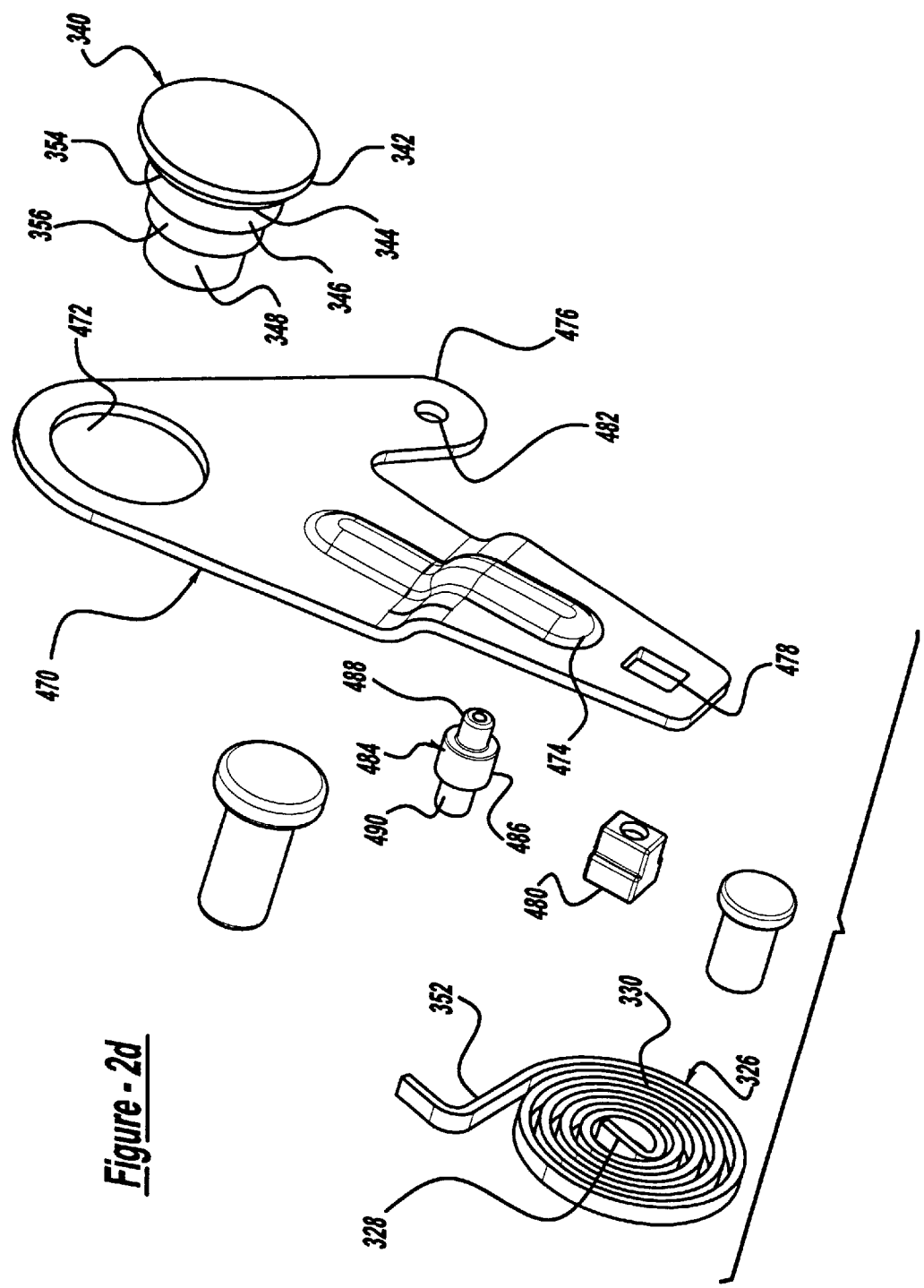
FIG. 2D is an exploded perspective view of a lever assembly of FIG. 2.

With reference to FIGS. 1 through 4, a preferred embodiment of a seat hinge assembly 10 will be described in detail.

The seat hinge assembly 10 includes a lower support member 12, an intermediate support member 14 pivotally supported at a lower portion by the lower support member 12, and an upper support member 16 pivotally supported by an upper portion of the intermediate support member 14. A spindle 18 is rotatably supported by the intermediate support member 14 and engages a locking arrangement for securing the upper support member 16 in first and second positions.

The spindle 18 is in operative communication with the upper support member 16 via the locking arrangement, which includes an upper cam 20 that interfaces a pawl 22, for selectively engaging the upper support member 16. The spindle 18 is also in operative communication with the lower support member 12 via the locking arrangement, which further includes a lower cam 24 and lock-pin 26. Initially, the spindle 18 is in a neutral position, however, rotation of the spindle 18 in a first direction enables the upper support member 16 to pivot relative to the intermediate support member 14. Return of the spindle 18 to the neutral position and subsequent rotation of the spindle 18 in a second direction enables rotation of the intermediate support member 14 relative to the lower support member 12. A linkage arrangement, described in further detail hereinbelow, is further provided for operatively interconnecting the spindle 18 and the locking arrangement.

The lower support member 12 includes a shoulder 28 extending from an upper edge 30. The shoulder 28 includes a first stop face 32, an arcuate face 34 and a second stop face 36. First and second upper faces 38, 40 are disposed on either side of the shoulder 28. An aperture 42 is disposed generally centrally through the lower support member 12 for receiving a lower pivot 44 therethrough.

The lower pivot 44 pivotally supports the intermediate support member 14 on the lower support member 12. The lower pivot 44 includes a central cylindrical body 46 having a bearing surface 48. First and second cylindrical bodies 50, 52, smaller in diameter than the central cylindrical body 46, coaxially flank the central cylindrical body 46. The first cylindrical body 50 includes a bearing surface 54 and the second cylindrical body 52 includes keyed surfaces 56. A third cylindrical body 58, smaller in diameter than the second cylindrical body 52, is disposed coaxially adjacent the second cylindrical body 52. The lower pivot 44 is received through the aperture 42 of the lower support member 12, whereby the bearing surface 48 of the central cylindrical body 46 provides smooth rotation of the lower pivot 44 within the aperture 42.

The intermediate support member 14 includes inner and outer support plates 60, 62 each having lower pivot apertures 64, 66, respectively, disposed through a lower end. The lower pivot aperture 64 of the inner support plate 60 is keyed to and receives the second cylindrical body 52 of the lower pivot 44. In this manner, the lower pivot 44 is fixed for rotation with the inner support plate 60. The lower pivot aperture 66 of the outer support plate 62 receives the first cylindrical body 50 of the lower pivot 44. The inner and outer support plates 60, 62 include forward extending support arms 70, 72, respectively, for supporting a load in cantilever fashion, as discussed herein below. The support arms 70, 72 each include a pair of apertures 74, 76 for attaching an external member, such as a seat or seat back, thereto.

A pair of spacers 78, 80 are disposed between and supported by the inner and outer support plates 60, 62, defining a distance between the inner and outer support plates 60, 62. The spacers 78, 80 each include secondary cylindrical bodies 84 coaxially flanking a central cylindrical body 82. The secondary cylindrical bodies 84 are generally smaller in diameter than the central cylindrical body 82, thereby enabling the central cylindrical body 82 to act as a shoulder. The secondary cylindrical bodies 84 are received into apertures 86 of the inner and outer support plates 60, 62 whereby the width of the central cylindrical body 82 defines the distance between the inner and outer support plates 60, 62.

First and second support pins 88, 90 are disposed between and supported by the inner and outer support plates 60, 62. The support pins 88, 90 each include a central cylindrical body 92 coaxially flanked by secondary cylindrical bodies 94. The secondary cylindrical bodies 94 are generally smaller in diameter than the central cylindrical body 92, thereby enabling the central cylindrical body 92 to act as a shoulder. The secondary cylindrical bodies 94 are received into apertures 96 of the inner and outer support plates 60, 62 and are thereby supported between the inner and outer support plates 60, 62. The first and second support pins 88, 90 selectively interface the first and second upper faces 38, 40, respectively, to define a rotational range of the intermediate support member 14 relative to the lower support member 12, as described in further detail hereinbelow.

The upper support member 16 includes a generally central upper pivot aperture 98 for receiving an upper pivot 100 therethrough. The upper pivot 100 is supported between the inner and outer support plates 60, 62 through upper pivot apertures 102, 104, respectively disposed through upper ends of the inner and outer support plates 60, 62. The upper pivot 100 includes a first cylindrical body 106 having a groove 108 formed through its diameter and a second cylindrical body 110 disposed coaxially to the first cylindrical body 106 and having keyed surfaces 112. A radially extending disc 114 is coaxially disposed between the first and second cylindrical bodies 106, 110 and is larger in diameter than the first or second cylindrical bodies 106, 110. A third cylindrical body 116 is disposed coaxially adjacent to the second cylindrical body 110 and includes a pair of keyed surfaces 118 disposed diametrically on a leading end of the body 116. A bearing surface 120 is formed from the remaining portion of the third cylindrical body 116. Fourth and fifth cylindrical bodies 122, 124 extend coaxially, in stepped fashion, from the third cylindrical body 116 and include bearing surfaces, 126, 128 respectively.

The upper pivot aperture 104 of the outer support plate 62 is keyed to receive the upper pivot 100 therethrough. The keyed opening of upper pivot aperture 104 mates with the keyed surfaces 112 of the second cylindrical body 110. The upper pivot 100 is also received through the upper pivot aperture 98 of the upper support member 16, whereby the upper support member 16 is rotatably supported about the bearing surface 120 of the third cylindrical body 116. The upper pivot aperture 102 of the inner support plate 60 is also keyed to receive the keyed surfaces 118 of the third cylindrical body 116. In this manner, the upper pivot 100 is fixed relative to the intermediate support member 14 and the upper support member 16 is rotatable about the upper pivot 100.

The upper pivot 100 also pivotally supports a cam plate 140 along an outside surface 142 of the inner support plate 60. The cam plate 140 is generally tear-shaped and includes an aperture 144 disposed generally centrally therethrough and an aperture 146 disposed through an apex end. The cam plate 140 further includes a cam surface 148 as well as a notch 150 formed in an edge 152 adjacent the cam surface 148. The upper pivot 100 is received through the aperture 144, whereby the aperture 144 is rotatable about the bearing surface 126 of the fourth cylindrical body 122. In this manner, the upper support member 16 and the cam plate 140 share a common axis of rotation.

The cam plate 140 is fixed for rotation with the upper support member 16 via a pin 154. The pin 154 includes a central cylindrical body 156 having first and second cylindrical bodies 158, 160 extending therefrom. The first and second cylindrical bodies 158, 160 are received into apertures 146, 164 of the cam plate 140 and the upper support member 16, respectively, whereby the pin 154 is supported therebetween. The central cylindrical body 156 includes a circumferential surface 166 that selectively abuts first and second stop shoulders 168, 170 of the inner support plate 60 to define a range of rotational motion of the upper support member 16 and the cam plate 140 relative to the intermediate support member 14. In an upright position, the circumferential surface 166 seats against the first stop shoulder 168 of the inner support plate 60, prohibiting further reclining of the upper support member 16 relative to the intermediate support member 14. In a forward position, the circumferential surface 166 seats against the second stop shoulder 170 prohibiting further forward folding of the upper support member 16 relative to the intermediate support member 18.

The upper support member 16 and cam plate 140 are rotationally biased relative to the intermediate support member 14 by a main spring 172. The main spring 172 is a coil-type spring commonly known in the art and includes a plate end 174, a series of coils 176, and an outwardly extending, curved end 178. The plate end 174 of the main spring 172 is received into the groove 108 of the first cylindrical body 106 of the upper pivot 100. The curved end 178 of the main spring 172 abuts a post 180 that extends from the upper support member 16. The post 180 includes a main cylindrical body 182, a smaller cylindrical body 184 and a disc end 186. The smaller cylindrical body 184 is received into an aperture 188 of the upper support member 16 for securing the post 180. The curved end 178 of the main spring 172 engages a circumferential surface 190 of the main cylindrical body 182. The main spring 172 biases the upper support member 16 and the cam plate 140 in a generally counter-clockwise direction of rotation, as shown in FIG. 1, relative to the intermediate support member 14.

The outer support plate 62 of the intermediate support member 14 includes a central aperture 192 for receiving and supporting the spindle 18 therethrough. The spindle 18 includes an end forming a radially extending disc 194, and first, second, third and fourth cylindrical bodies 196, 198, 200, 202 extending, in stepped fashion, therefrom. The first and second cylindrical bodies 196, 198 include bearing surfaces 204, 206, respectively. The third cylindrical body 200 includes keyed surfaces 208 and the fourth cylindrical body 202 includes an elongated spline portion 210. The spindle 18 functionally supports the linkage arrangement, which is disposed external to the intermediate support member 14 along an outside surface 212 of the outer support plate 62.

The linkage arrangement includes a lever plate 214, a release plate 232, a spindle lever 250, a linkage plate 230, a cam lever 282, a cam linkage 246 and a tumble plate 450. The lever plate 214, linkage plate 230 and cam lever 282 cooperate to manipulate the upper cam 20 in response to input of the spindle lever 250. Similarly, the release plate 232, cam linkage 246 and tumble plate 450 cooperate to manipulate the lower cam 24 in response to input of the spindle lever 250. Specific detail of the various components of the linkage arrangement and their interaction are described in further detail hereinbelow.

The lever plate 214 includes a centrally disposed aperture 216 and first and second extending arms 218, 220. The aperture 216 receives the spindle 18 therethrough, whereby the lever plate 214 is rotatably supported by the bearing surface 204 of the first cylindrical body 196. The lever plate 214 is rotationally biased about the spindle 18 by a spring 222. The first arm 218 includes an aperture 224 for securing an end of the spring 222. The opposite end of the spring 222 is secured by a first arm 236 of the release plate 232. The second arm 220 of the lever plate 214 includes a stepped portion having an aperture 226 therethrough. The aperture 226 receives a rivet 228 for operatively connecting the second arm 220 to the linkage plate 230, as described in further detail below.

The release plate 232 includes a centrally disposed aperture 234 and first and second extending arms 236, 238. The aperture 234 receives the spindle 18 therethrough, whereby the release plate 232 is rotatably supported by the bearing surface 206 of the second cylindrical body 198. The release plate 232 is rotationally biased about the spindle 18 by the spring 222. The first arm 236 includes an aperture 240 for securing an end of the spring 222. As described above, the opposite end of the spring 222 is secured by the first arm 218 of the lever plate 214. In this manner, the lever and release plates 214, 232 are rotationally biased relative to one another about the spindle 18. The second arm 238 of the release plate 232 includes a stepped portion having an aperture 242 therethrough. The aperture 242 receives a rivet 244 for operatively connecting the second arm 238 to a cam linkage 246, as described in further detail below.

The spindle lever 250 includes a keyed aperture 252 therethrough for matingly receiving the keyed surfaces 208 of the third cylindrical body 200 of the spindle 18. In this manner, the spindle lever 250 is fixed for rotation with the spindle 18. The spindle lever 250 also includes an extending arm 256 having a perpendicularly extending actuating end 258. The perpendicular end 258 extends through an arcuate slot 260 of the outer support plate 62 and selectively engages either the release plate 232 or lever plate 214 for initiating rotation of the respective plate about the spindle 18. A finger 262 extends from the perpendicular end 258 of the spindle lever 250 for selectively contacting the pawl 22, as described in further detail hereinbelow.

The linkage plate 230 operatively connects the lever plate 214 to the upper cam 20 and pawl 22 arrangement for selectively enabling the upper support member 16 to rotate relative to the intermediate support member 14. The linkage plate 230 includes an aperture 272 disposed through a first end for connecting the linkage plate 230 to the lever plate 214 via a rivet 228. A bearing body 276 of the rivet 228 is received into the aperture 272, whereby the linkage plate 230 is freely rotatable about the rivet 274. The linkage plate 230 includes a step along its length and a slot 276 formed through a second end. The slot 276 receives a rivet 278, which includes a bearing body 280 for enabling the rivet 278 to slide freely along the length of the slot 276. The rivet 278 operatively connects the linkage plate 270 with the cam lever 282, which includes a first aperture 284 for interconnection with the rivet 278. A second aperture 286 at an opposite end of the cam lever 282 includes keyed surfaces 288.

The cam lever 282 is supported by and fixed for rotation with an upper cam pivot 290. The upper cam pivot 290 is rotatably supported by the inner and outer support plates 60, 62 through apertures 292, 294, respectively, and includes a first cylindrical body 296 having keyed surfaces 298. A second cylindrical body 300 having a circumferential bearing surface 302 is disposed coaxially adjacent to a radially extending disc 304. Third and fourth cylindrical bodies 306, 308 coaxially flank the disc 304. The third cylindrical body 306 includes keyed surfaces 310. The fourth cylindrical body 308 includes a groove 312 formed through its diameter and a circumferential bearing surface 314.

The second and fourth cylindrical bodies 300, 308 are respectively received into the apertures 292, 294 of the inner and outer support plates 60, 62, respectively, whereby the bearing surfaces 302, 314 of the upper cam pivot 290 provide smooth rotation of the upper cam pivot 290 within the apertures 292, 294. The first cylindrical body 296 is received through the second aperture 286 of the cam lever 282, whereby the keyed surfaces 298 of the first cylindrical body 296 are matingly recessed by the keyed surfaces 288. Thus, the cam lever 282 is fixed for rotation with the upper cam pivot 290.

The upper cam 20 includes a cam surface 320 and a keyed aperture 322. The upper cam pivot 290 is received within the keyed aperture 322 of the upper cam 20, whereby the keyed surfaces 310 of the third cylindrical body 306 are matingly received by the keyed aperture 322. In this manner, the upper cam 20 is fixed for rotation with the upper cam pivot 290. Further, the upper cam pivot 290 is biased in a first rotational direction by an upper cam spring 326. The upper cam spring 326 is preferably a coil-type spring commonly known in the art, including a plate end 328, a series of coils 330, and an outwardly extending, curved end 332. The plate end 328 of the upper cam spring 326 is received into the groove 312 of the fourth cylindrical body 308 of the upper cam pivot 290. The curved end 332 of the upper cam spring 326 interfaces a bracket 334 that extends outwardly from the inner support plate 60.

The pawl 22 is pivotally supported between the inner and outer support plates 60, 62 via a pawl rivet 340. The pawl rivet 340 includes a disc end 342 having first, second and third cylindrical bodies 344, 346, 348 coaxially extending therefrom and progressively decreasing in diameter. The pawl rivet 340 is received through and supported by apertures 350, 352 in the inner and outer support plates 60, 62, respectively. The first and second cylindrical bodies 344, 346 respectively include first and second bearing surfaces 354, 356. The second cylindrical body 346 is received through an aperture 358 of the pawl 22, whereby the bearing surface 356 enables smooth rotation of the pawl 22 about the pawl rivet 340.

The pawl 22 includes a plurality of pawl teeth 360 extending from an upper face 362 of the pawl 22 and a cam surface 364 formed along a distal end of the pawl 22. The plurality of pawl teeth 360 mesh with a plurality of teeth 366 extending from a lower edge 368 of the upper support member 16 to retain the upper support member 16 in a selected rotational position relative to the intermediate support member 14. The cam surface 364 slidably engages the cam surface 320 of the upper cam 20 to selectively mesh the teeth 360 of the pawl 22 with the teeth 366 of the upper support member 16. First and second arms 370, 372 extend outwardly from the pawl 22 to define first and second grooves 374, 376, respectively. An aperture 378 is disposed at a proximal end of the pawl 22. It should be further noted that the number of teeth 366 may vary along the length of the lower edge 368 of the upper support member 16, covering the full length. In this manner, a wide range of engagement points are available for the pawl teeth 360 to engage the teeth 366. Thus, a range of lockable recline positions is provided for the upper support member 16 relative to the intermediate support member 14.

The lower cam 24 is rotatably supported between the inner and outer support plates 60, 62 by a lower cam pivot 380. The lower cam 24 includes a cam surface 382 for selectively engaging the lock pin 26 and a keyed aperture 384. The lower cam pivot 380 is rotatably supported between the first and second support plates 60, 62 through apertures 388, 390, respectively, and includes a centrally disposed body 392 having key surfaces 394. First and second cylindrical bodies 396, 398 coaxially extend from one side of the centrally disposed body 392. The second cylindrical body 398 is smaller in diameter than the first cylindrical body 396 and includes key surfaces 400. A groove 402 is formed through the diameter of the first and second cylindrical bodies 396, 398 whereby the groove 402 extends completely through the length of the second cylindrical body 398 and partially through the length of the first cylindrical body 396. The first cylindrical body 396 includes an exterior bearing surface 404. A third cylindrical body 406 coaxially extends from an opposite side of the centrally disposed body 392 and includes a bearing surface 408. A key portion 410 extends coaxially from the third cylindrical body 406, tapering at a distal end to a keyed end 412. The lower cam pivot 380 is supported in the apertures 388, 390 of the inner and outer support plates 60, 62 and the bearing surfaces 404, 408 provide smooth rotation of the lower cam pivot 380 within the apertures 388, 390.

The lower cam pivot 380 supports the lower cam 24 by receiving the centrally disposed body 392 in the aperture 384. The key surfaces 394 of the centrally disposed body 392 align with the keyed aperture 384 to fix the lower cam 24 for rotation with the lower cam pivot 380. Further, the lower cam pivot 380 is biased in a first rotational direction by a lower cam spring 414. The lower cam spring 414 is preferably a coil-type spring commonly known in the art and includes a plate end 416, a series of coils 418, and an outwardly extending, curved end 420. The plate end 416 of the lower cam spring 414 is received into the groove 402 of the first and second cylindrical bodies 396, 398 of the lower cam pivot 380. The curved end 420 of the lower cam spring 414 abuts a bracket 422 that extends outwardly from the outer support plate 62.

The lock-pin 26 includes a generally triangular-shaped central body 430 flanked by first and second rectangular bodies 432, 434. The inner and outer support plates 60, 62 include slots 436, 438 for respectively receiving the first and second rectangular bodies 432, 434 of the lock-pin 26. In this manner, the lock-pin 26 is slidably supported between the inner and outer support plates 60, 62. The central body 430 of the lock-pin 26 includes an upper arcuate face 440 and first and second side faces 442, 444 that apex to a lower arcuate face 446. The upper arcural face 440 slidably interfaces the cam surface 382 of the lower cam 24 to selectively force the lock-pin 26 against the lower support member 12.

The tumble plate 450 is fixed for rotation with the lower cam pivot 380, and is generally tear shaped, including first and second apertures therethrough 452, 454. The first aperture 452 is keyed to receive the second cylindrical body 398 of the lower cam pivot 380 therein, whereby the key surfaces 400 of the lower cam pivot 380 mate with the keyed aperture 452. The tumble plate 450 is pivotally interconnected to the cam link 246 via a rivet 458. The cam link 246 includes first and second apertures 460, 462 disposed on opposite ends of a step formed intermediate its length. The first aperture 460 receives the rivet 458 therethrough to pivotally interconnect the tumble plate 450 and the cam link 246. The rivet 244 is received through the second aperture 462 to pivotally interconnect the cam link 246 and the release plate 232.

A lever 470 is also included and is pivotally supported along the outside surface 142 of the inner support plate 60 by the pawl rivet 340. The L-shaped lever 470 includes a first arm 474 and a second arm 476 joined at an intersection to define an acute angle. The intersection includes an aperture 472 therethrough to receive the first cylindrical body 344 of the pawl rivet 340. The bearing surface 354 of the pawl rivet 340 enables smooth rotation of the lever 470 about the pawl rivet 340. In this manner, the pawl 22 and the lever 470 share a common axis of rotation. The first arm 474 includes a step disposed along an intermediate length and a generally square aperture 478 formed through an end. The square aperture 478 receives and secures a square rivet 480 therethrough. The square rivet 480 selectively engages the notch 150 and cam surface 148 of the cam plate 140, as described in further detail below. The second arm 476 of the lever 470 includes an aperture 482 therethrough for fixing the lever 470 for rotation with the pawl 22 via a lever rivet 484. The lever rivet 484 includes a central cylindrical body 486 with first and second cylindrical bodies 488, 490 coaxially extending therefrom. The first cylindrical body 490 is received into the aperture 378 of the pawl 22 and the second cylindrical body 488 is received into the aperture 482 of the second arm 476 of the lever 470, whereby the lever 470 and pawl 22 are interconnected. The inner support plate 60 includes a generally oval-shaped aperture 492 that enables the lever rivet 484 to pass therethrough. The lever rivet 484 is free to move within the aperture 492 as the pawl 22 and the lever 470 are caused to rotate about the pawl rivet 340.

With particular reference to FIGS. 1 through 4, operation of the seat hinge assembly 10 will be described in detail. As shown in FIG. 1, the seat hinge assembly 10 is in an upright position. In this position the intermediate support member 14 is fixed relative to the lower support member 12. Forward rotation of the intermediate support member 14 is prohibited by the first support pin 88 contacting the first upper face 38 of the lower support member 12. Rearward rotation of the intermediate support member 14 is prohibited by the lock-pin 26 interfacing the shoulder 28 of the lower support member 12. The lock-pin 26 is wedged downward by the lower cam 24 into contact with the first stop face 32 of the shoulder 28. The upper support member 16 is fixed relative to the intermediate support member 14 via the meshed teeth engagement between the pawl teeth 360 and the teeth 366 of the upper support member 16. The pawl 22 is forced into engagement with the upper support member 16 by the upper cam 20.

Figure 3:
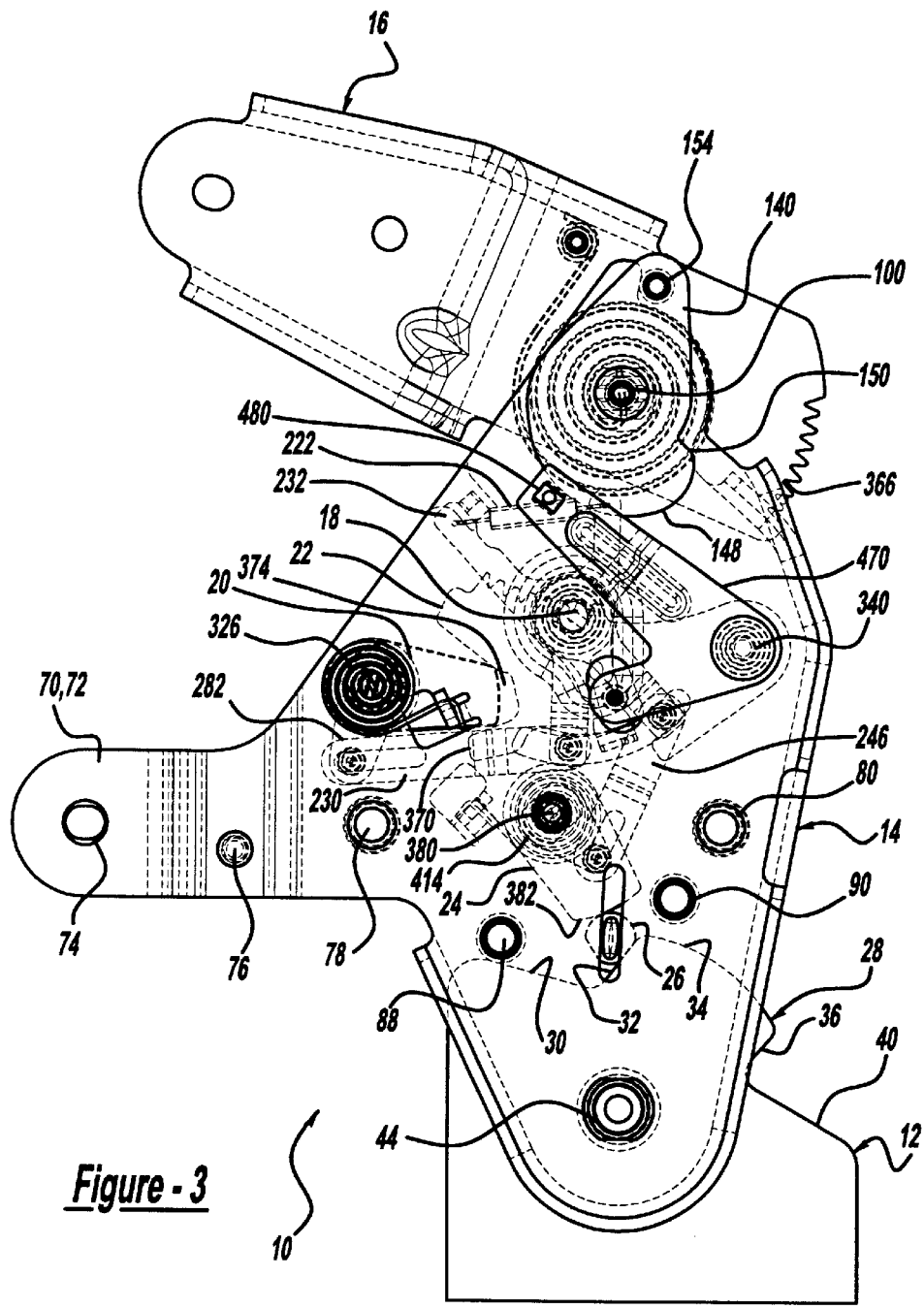
FIG. 3 is a side view of the seat hinge assembly of FIG. 1, showing an upper support member in a fold forward position.

To initiate disengagement of the pawl 22 and upper support member 16, the spindle 18 is rotated from a neutral position in a clockwise direction. The rotation of the spindle 18 further rotates the spindle lever 250 in a clockwise direction. Sufficient clockwise rotation of the spindle lever 250 results in the actuating end 258 of the spindle lever 250 to contact and push the second arm 220 of the lever plate 214, further rotating the lever plate 214 in a clockwise direction against the biasing force of the spring 222. The clockwise rotation of the lever plate 214 drives the linkage plate 230 forward, whereby the rivet 278 travels along the slot 276, ultimately contacting an end of the slot 276 and forcing the cam lever 282 to rotate in a clockwise direction. Rotation of the cam lever 282 rotates the upper cam spindle 290, which further rotates the upper cam 20 in a clockwise direction until the upper cam 20 disengages the cam surface 364 of the pawl 22 and subsequently forces the first arm 370 of the pawl 22 downward. The downward motion of the first arm 370 rotates the pawl 22 counterclockwise until it disengages the upper support member 16, which is then able to rotate forward (counterclockwise) relative to the intermediate support member 14. This is best shown in FIG. 3. Once the pawl 22 has been rotated counterclockwise to disengage the upper support member 16, the square rivet 480 is disengaged from the notch 150 of the cam plate 140.

As the upper support member 16 rotates forward (counterclockwise) to a fold-flat position relative to the intermediate support member 14, several simultaneous actions occur. The cam plate 140 slidably engages the square rivet 480 to hold the lever 470 downward by (counterclockwise) rotated position. Because the lever 470 is fixedly attached to the pawl 22, the lever 470 holds the pawl 22 in a downward position, without actuation of the spindle 18. In this manner, the spindle 18 is free to rotate back to the neutral position. Further, the upper cam 20 is held within the first groove 374 of the pawl 22 and is prevented from rotating. The bias force of the spring 222 pulls the lever plate 214 counter-clockwise, thus forcing the spindle lever 250 back to its neutral position.

It should be noted, however, that prior to the above-described fold-forward process and the resulting downward (counterclockwise) positioning of the pawl 22, the actuating finger 262 of the spindle lever 250 contacts a front face 494 of the second arm 372 of the pawl 22 when attempting to rotate the spindle 18 in a counter-clockwise direction (the previously described operation occurring upon clockwise rotation of the spindle 18) from its rest position. Because of the resulting downward positioning of the pawl 22 after clockwise rotation of the spindle 18 and the resulting actions described above, the second groove 376 aligns with the finger 262 of the spindle lever 250, whereby the finger 262 is able to travel into the groove 376. That is, after initial clockwise rotation of the spindle 18 to disengage the pawl 22, the spindle 18 is free to rotate in a counter-clockwise direction. This safety feature ensures that the fold-forward process of the upper support member 16 occurs prior to the other folding processes described next.

Counter-clockwise rotation of the spindle 18 causes the finger 262 of the spindle lever 250 to travel through the second groove 376 of the pawl 22 until the actuating end 256 contacts the release plate 232. Upon contact, the spindle lever 250 rotates the release plate 232 counter-clockwise about the spindle 18 and against the bias of the spring 222. The lever plate 214 remains in a fixed position via linkage to the now-secured upper cam 20 (within the first groove 374), thereby anchoring the spring 222 to provide the bias force. Counter-clockwise rotation of the release plate 232 pulls the cam linkage 246 upward, thus rotating the tumble plate 450 and lower cam spindle 380 counterclockwise against the bias of the lower cam spring 414. Rotation of the lower cam spindle 380 causes the lower cam 24 to also rotate counter-clockwise and disengage from the lock-pin 26.

Disengagement of the lower cam 24 from the lock-pin 26 enables the intermediate support member 14 to rotate backward (clockwise) relative to the lower support member 12 by allowing the lock-pin 26 to slide between the inner and outer support plates 60, 62 in the slots 436, 438, respectively. Rearward (clockwise) rotation of the intermediate support member 14 causes inside surfaces of the slots 436, 438 to push the rectangular bodies 432, 434 of the lock-pin 26, and thus the first side face 442 of the lock pin 26, into sliding engagement with the first stop face 32 of the shoulder 28. As the lock pin 26 is forced against the shoulder 28, it slides upward within the slots 432, 434 until reaching the top of the first stop face 32. Having reached the top of the first stop face 32, the lower arcuate face 446 of the lock pin 26 slides over and along the arcuate face 34 of the shoulder 28.

Figure 4:
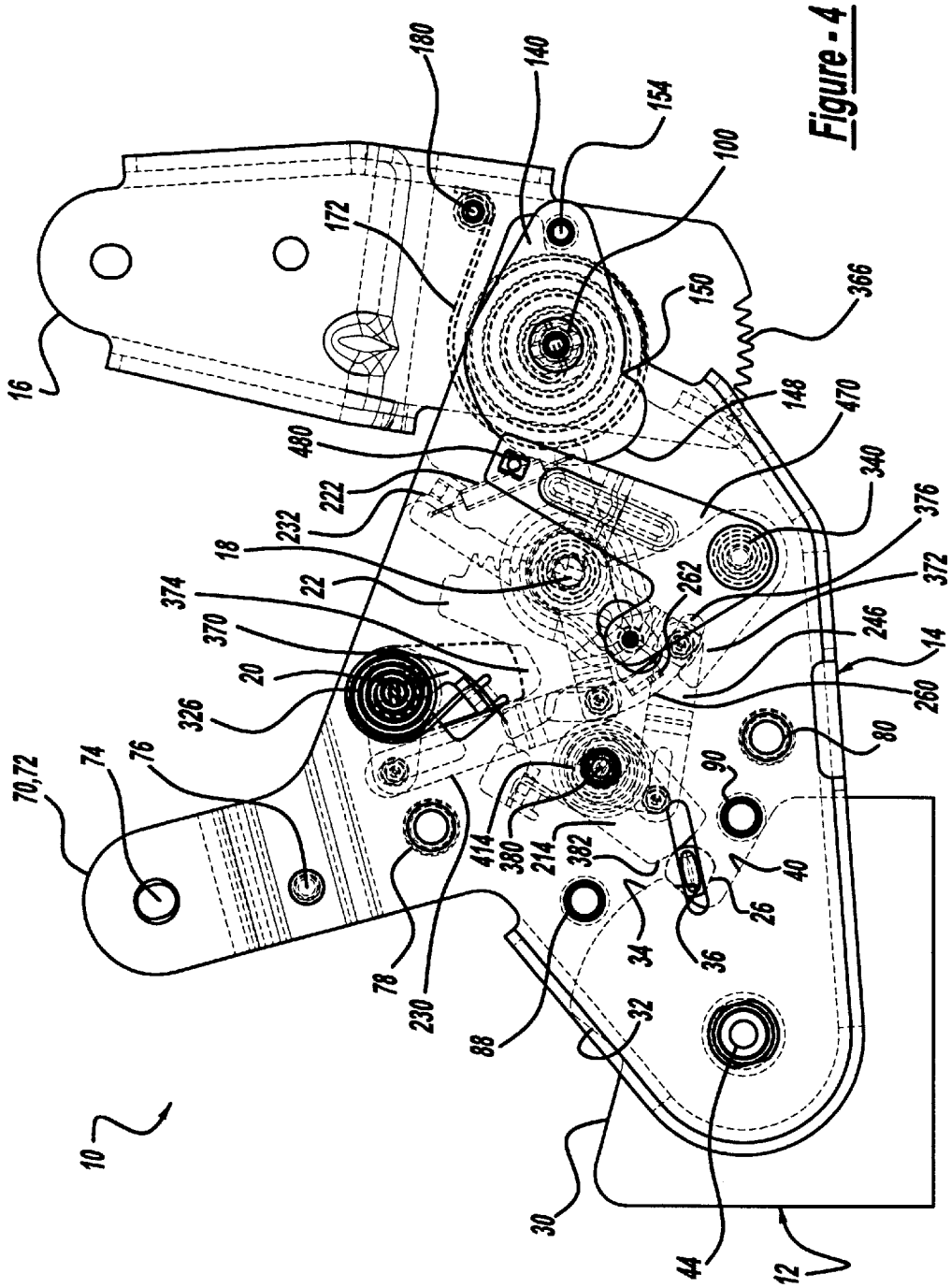
FIG. 4 is a side view of the seat hinge assembly of FIG. 3 showing an intermediate support member in a fold backward position.

The intermediate support member 14 is able to continue to rotate rearward (clockwise) relative to the lower support member 12 until the second support pin 90 contacts the second upper face 40 of the lower support member 12, thereby prohibiting further rearward rotation. To lock the intermediate support member 14 in the rearward fold position, the lock pin 26 is again wedged against the shoulder 28. By releasing the spindle 18, the biasing force of the lower cam spring 414 urges the lower cam 24 in a clockwise direction, engaging the lock-pin 26 and pushing the lock-pin 26 downward along the slots 436, 438. Concurrently, the spindle 18 returns to the neutral rotational position. The second side face 444 of the lock-pin 26 wedges against the second stop face 36 of the shoulder 28, thus locking the intermediate support member 14 relative to the lower support member 12. In this manner, the upper support member 16 is locked in a forward-fold position relative to the intermediate support member 14 and the intermediate support member 14 is locked in a rearward-fold position relative to the lower support member 12, as best illustrated in FIG. 4.

To return the seat hinge assembly 10 to its original upright position, the spindle 18 is rotated counterclockwise from the neutral position to disengage the lower cam 24 from the lock pin 26. The lock-pin 26 is then free to slide upward within the slots 436, 438 as the intermediate support member 14 is caused to rotate forward (counterclockwise) relative to the lower support member 12. The intermediate support member 14 is rotated forward until the first support pin 88 contacts the first upper face 38 of the upper edge 30, thereby prohibiting further forward rotation. To lock the intermediate support member 14 in the forward-fold position, the lock-pin 26 is wedged against the surface 32 of the shoulder 28. By releasing the spindle 18, the biasing force of the lower cam spring 414 urges the lower cam 24 in a clockwise direction, again pushing the lock-pin 26 downward along the slots 436, 438. Concurrently, the spindle 18 returns to the neutral rotational position. The first side face 442 of the lock-pin 26 again wedges against the first stop face 32 of the shoulder 28, thus locking the intermediate support member 14 relative to the lower support member 12 in an upright position.

Once the intermediate support member 14 is locked in the upright position relative to the lower support member 12, the upper support member 16 may be returned to its upright position relative to the intermediate support member 14. To achieve this, the upper support member 16 is caused to rotate rearward against the biasing force of the main spring 172. As the upper support member 16 rotates, the square rivet 480 slides along the cam surface 148 of the cam plate 140 until it abuts the notch 150. It should be noted that the pawl 22, and thus the lever 470 and square rivet 480, are continuously biased upwardly (clockwise) by the upper cam 20, which is positioned in the first groove 374 of the pawl 22. In this manner, the square rivet 480 is biased against the cam surface 148 of the cam plate 140 as it slides along the rearwardly (clockwise) rotating cam plate 140. Once adjacent the notch 150 of the cam plate 140, the square rivet 480 is biased upwardly into engagement with the notch 150, thereby rotating the lever 470 and the interconnected pawl 22 in a clockwise direction. As the upper cam 20 pushes the pawl 22 further in the clockwise direction due to the biasing force of the upper cam spring 326, the pawl teeth 360 of the pawl 22 are again biased toward meshing engagement with the plurality of teeth 366 of the upper support member 16, thereby locking the upper support member 16 relative to the intermediate support member 14.

Figure 5:
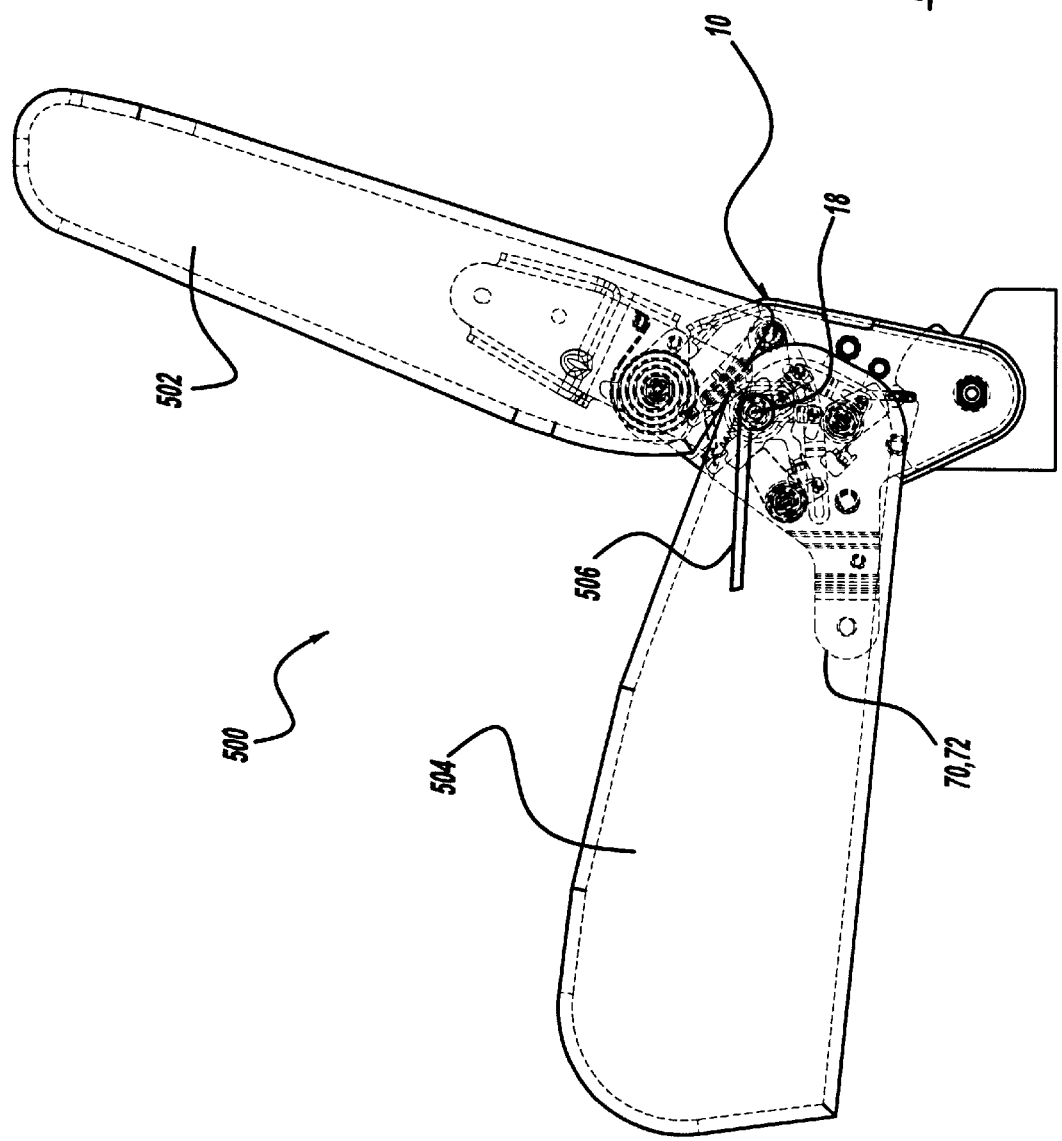
FIG. 5 is a schematic view of a seat assembly implementing the seat hinge assembly of the present invention.

With particular reference to FIG. 5, a seat assembly 500 is shown, which incorporates the seat hinge assembly 10 of the present invention. The seat assembly 500 includes a seatback 502 that is fixedly attached to the upper support member 16 and a seat 504 that is fixedly attached to the intermediate support member 14. The support arms 70, 72 of the intermediate support member 14 provide cantilever support for the seat 504 and loads applied to the seat 504. In this manner, other support structures below the seat 504 are not required, thus freeing the area below the seat assembly 500. A handle 506 is also included and is fixedly attached to the spline portion 210 of the spindle 18 for enabling rotation of the spindle 18. The seat assembly 500 is foldable into a stowed position through actuation of the seat hinge assembly 10 in the manner described in detail above. Initially, the handle 506 is pulled upwardly to rotate the spindle 18 clockwise, thus enabling the upper support member 16 and the attached seatback 502 to fold forward. Subsequently, the handle 506 is pushed downwardly to rotate the spindle 18 counter-clockwise, thus enabling the intermediate support member 14, the attached seat 504 and the seatback 506 to fold backward. In this manner, the seat assembly 500 is foldable into the stowed position, thereby freeing the area that the seat assembly 500 had previously occupied to provide a storage space.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A seat hinge assembly comprising:
   a first support;
   a second support pivotally supported by said first support about a first axis;
   a third support pivotally supported by said second support about a second axis; and
   a spindle rotatably supported by said second support, said spindle in operative communication with said first and third supports, said spindle rotatable in a first direction to a first position and an opposite direction to a second position, said third support rotatable about said second axis when said spindle is in said first position and said second support rotatable about said first axis when said spindle is in said second position.

2. The seat hinge assembly of claim 1, further comprising:
   a locking arrangement operatively interconnecting said spindle with said first and third supports;
   said locking arrangement disengaging said third support when said spindle is in said first position, thereby enabling rotation of said third support about said second axis; and
   said locking arrangement disengaging said first support when said spindle is in said second position, thereby enabling rotation of said second support about said first axis.

3. The seat hinge assembly of claim 2, wherein said spindle is blocked against rotation to said second position before said third support is rotated about said second axis.

4. The seat hinge assembly of claim 2, wherein said locking arrangement comprises:
   a pawl pivotally supported by said second support and in selective engagement with said third support for selectively locking said third support in one of a plurality of positions relative to said second support; and
   a lock pin slidably supported by said second support and in selective engagement with said first support to selectively locking said second support in one of a plurality of positions relative to said first support.

5. The seat hinge assembly of claim 4, wherein said locking arrangement further comprises:
   a first cam pivotally supported by said second support and in sliding engagement with said pawl to selectively force said pawl into engagement with said third support; and
   a second cam pivotally supported by said second support and in sliding engagement with said lock pin to selectively force said lock pin into engagement with said first support.

6. The seat hinge assembly of claim 4, wherein said locking arrangement further comprises:
   a lever fixed for rotation with said pawl and further including a first end in sliding engagement with a cam surface extending from said third support, said lever disengaging said pawl from said third support during rotation of said third support about said second axis.

7. The seat hinge assembly of claim 5, further comprising a spring biasing said first cam in a first direction of rotation.

8. The seat hinge assembly of claim 5, further comprising a spring biasing said second cam in a first direction of rotation.

9. The seat hinge assembly of claim 2, further comprising a linkage arrangement for operatively coupling said spindle and said locking arrangement.

10. The seat hinge assembly of claim 9, wherein said linkage arrangement comprises:
    a lever plate rotatably supported about said spindle;
    a release plate rotatably supported about said spindle, wherein said release plate and said lever plate are biased relative to one another by a spring; and
    a spindle lever fixed for rotation with said spindle, said spindle lever including a finger for selectively moving one of either said release plate and said lever plate in a rotational direction.

11. The seat hinge assembly of claim 10, wherein said linkage arrangement further comprises:
    a first cam lever fixed for rotation with a first cam of said locking arrangement;
    a first linkage plate operably interconnecting said first cam lever and said lever plate;
    a second cam lever fixed for rotation with a second cam of said locking arrangement; and
    a second linkage plate operably interconnecting said second cam lever and said release plate.

12. A seat hinge assembly comprising:
    a first support having a shoulder;
    a second support pivotally supported by said first support about a first axis and selectively rotated relative to said first support;
    a pawl pivotally supported by said second support;

a third support pivotally supported about a second axis by said second support;

a locking arrangement supported by said second support, selectively engaging said shoulder of said first support to retain said second support in one of a plurality of rotational positions relative said first support, and selectively forcing said pawl into engagement with said third support to retain said third support in one of a plurality of rotational positions relative to said second support; and a spindle rotatably supported by said second support and in operative communication with said locking arrangement, said spindle rotatable in a first direction to a first position to disengage said pawl from said third support and enable rotation of said third support about said second axis, said spindle rotatable in an opposite direction to a second position to disengage said locking arrangement from said shoulder and enable rotation of said second support about said first axis.

13. The seat hinge assembly of claim 12, wherein said spindle is blocked against rotation to said second position before said third support is rotated about said second axis.

14. The seat hinge assembly of claim 12, wherein said locking arrangement comprises:

a first cam pivotally supported by said second support and in sliding engagement with said pawl to selectively force said pawl into engagement with said third support; and a second cam pivotally supported by said second support and in sliding engagement with said lock pin for selectively biasing said lock pin into engagement with said first support.

15. The seat hinge assembly of claim 14, wherein said locking arrangement further comprises:

a lock pin slidably supported by said second support and in selective engagement with said first support to selectively lock said second support in one of a plurality of positions relative to said first support.

16. The seat hinge assembly of claim 14, wherein said locking arrangement further comprises:

a lever fixed for rotation with said pawl and further including a first end in sliding engagement with a cam surface extending from said third support, said lever disengaging said pawl from said third support during rotation of said third support about said second axis.

17. The seat hinge assembly of claim 14, further comprising a spring biasing said first cam in a first direction of rotation.

18. The seat hinge assembly of claim 14, further comprising a spring biasing said second cam in a first direction of rotation.

19. The seat hinge assembly of claim 12, further comprising a linkage arrangement operatively coupling said spindle and said locking arrangement.

20. The seat hinge assembly of claim 19, wherein said linkage arrangement comprises:

a lever plate rotatably supported about said spindle;

a release plate rotatably supported about said spindle, wherein said release plate and said lever plate are biased relative to one another by a spring; and a spindle lever fixed for rotation with said spindle, said spindle lever selectively moving one of said release plate and said lever plate in a rotational direction.

21. The seat hinge assembly of claim 20, wherein said linkage arrangement further comprises:

a first cam lever fixed for rotation with a first cam of said locking arrangement;

a first linkage plate operably interconnecting said first cam lever and said lever plate;

a second cam lever fixed for rotation with a second cam of said locking arrangement; and a second linkage plate operably interconnecting said second cam lever and said release plate.

22. A seat assembly comprising:

a seat hinge assembly comprising:

a first support;

a second support mounting a seat and pivotally supported by said first support about a first axis;

a third support mounting a seat back and pivotally supported by said second support about a second axis; and a spindle mounting a handle and rotatably supported by said second support, said spindle in operative communication with said first and third supports and rotatable in a first direction to a first position and an opposite direction to a second position, said third support rotatable about said second axis when said spindle is in said first position and said second and third supports rotatable about said first axis when said spindle is in said second position.

23. The seat assembly of claim 22, further comprising:

a locking arrangement operatively interconnecting said spindle with said first and third supports;

said locking arrangement disengaging said third support when said spindle is in said first position, thereby enabling rotation of said third support about said second axis; and said locking arrangement disengaging said first support when said spindle is in said second position, thereby enabling rotation of said second support about said first axis.

24. The seat assembly of claim 23, wherein said locking arrangement comprises:

a pawl pivotally supported by said second support and in selective engagement with said third support to selectively lock said third support in one of a plurality of positions relative to said second support; and a lock pin slidably supported by said second support and in selective engagement with said first support to selectively lock said second support in one of a plurality of positions relative to said first support.

25. The seat assembly of claim 24, wherein said locking arrangement further comprises:

a first cam pivotally supported by said second support and in sliding engagement with said pawl to selectively force said pawl into engagement with said third support; and a second cam pivotally supported by said second support and in sliding engagement with said lock pin to selectively force said lock pin into engagement with said first support.

26. The seat assembly of claim 25, further comprising a spring biasing said first cam in a first direction of rotation.

27. The seat assembly of claim 25, further comprising a spring biasing said second cam in a first direction of rotation.

28. The seat assembly of claim 24, wherein said locking arrangement further comprises:

a lever fixed for rotation with said pawl and further including a first end in sliding engagement with a cam surface extending from said third support, said lever disengaging said pawl from said third support during rotation of said third support about said second axis.

29. The seat assembly of claim 23, wherein said spindle is blocked against rotation to said second position before said third support is rotated about said second axis.

30. The seat assembly of claim 29, further comprising a linkage arrangement operatively coupling said spindle and said locking arrangement.

31. The seat assembly of claim 30, wherein said linkage arrangement comprises:

a lever plate rotatably supported about said spindle;

a release plate rotatably supported about said spindle, wherein said release plate and said lever plate are biased relative to one another by a spring; and a spindle lever fixed for rotation with said spindle, said spindle lever selectively moving one of said release plate and said lever plate in a rotational direction.

32. The seat assembly of claim 31, wherein said linkage arrangement further comprises:

a first cam lever fixed for rotation with a first cam of said locking arrangement;

a first linkage plate for operably interconnecting said first cam lever and said lever plate;

a second cam lever fixed for rotation with a second cam of said locking arrangement; and a second linkage plate for operably interconnecting said second cam lever and said release plate.

33. The seat assembly of claim 22, wherein said first support includes a cantilever support arm for said seat.

* * * * *